United States Patent [19]

Spenceley et al.

[11] 4,089,677
[45] May 16, 1978

[54] METAL REFINING METHOD AND APPARATUS

[75] Inventors: Gene D. Spenceley; Robert Baker; Roger A. Page, all of Sheffield, England

[73] Assignee: British Steel Corporation, London, England

[21] Appl. No.: 799,102

[22] Filed: May 20, 1977

[30] Foreign Application Priority Data

May 28, 1976 United Kingdom ............... 22341/76

[51] Int. Cl.² .................................................. C21C 5/32
[52] U.S. Cl. .......................................... 75/51; 75/59; 75/60
[58] Field of Search .......................... 75/60, 51, 52, 59

[56] References Cited

U.S. PATENT DOCUMENTS

| 3,556,773 | 1/1971 | Grenfell | 75/51 |
| 3,567,430 | 3/1971 | Engroff | 75/51 |
| 3,607,227 | 9/1971 | Stephenson | 75/51 |
| 3,801,084 | 4/1974 | Leroy | 75/51 |
| 3,854,932 | 12/1974 | Bishop | 75/60 |
| 3,876,421 | 4/1975 | Takemura | 75/51 |
| 3,902,889 | 9/1975 | Malin | 75/60 |
| 3,953,199 | 4/1976 | Michaelis | 75/60 |

Primary Examiner—P. D. Rosenberg
Attorney, Agent, or Firm—Bacon & Thomas

[57] ABSTRACT

Various forms of method and apparatus are described for the manufacture of steel wherein solid carbonaceous materials are injected below the surface of a melt during the introduction of oxygen to raise the energy level within the melt. Solid iron-bearing materials may also be introduced to the melt and a continuous tapping process is described wherein the iron-bearing and carbonaceous materials are delivered continuously to the melt.

17 Claims, 6 Drawing Figures

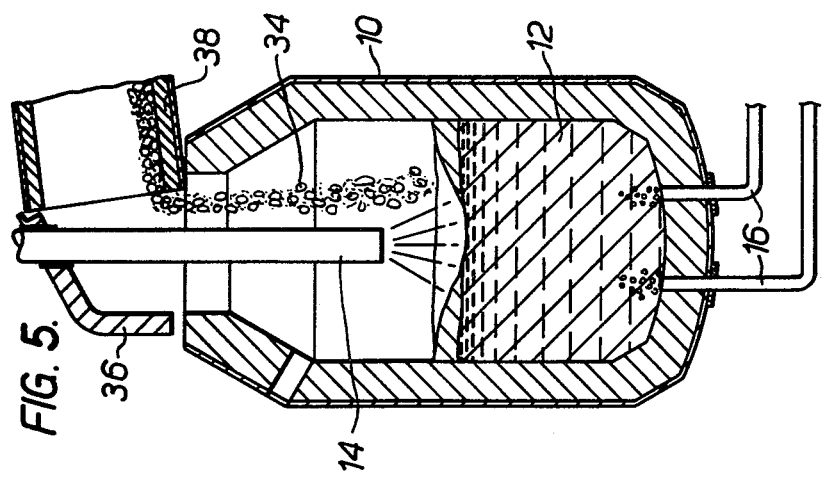
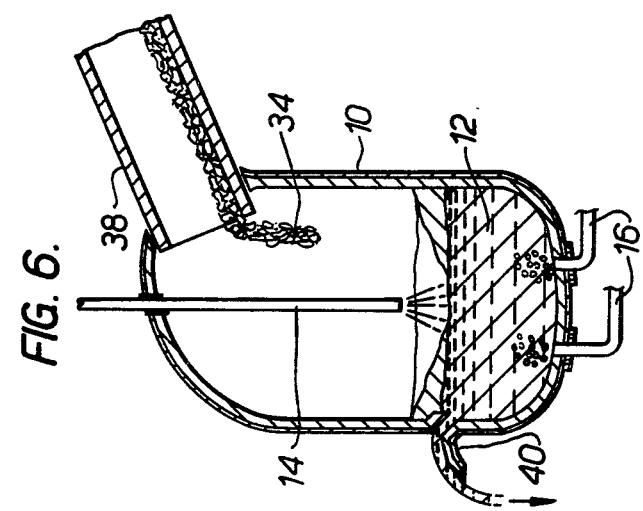

METAL REFINING METHOD AND APPARATUS

This invention relates to the manufacture of steel and in particular relates to a method and apparatus whereby solid iron-bearing materials can be converted to molten steel in a continuous, semi-continuous or batch mode.

In oxygen steelmaking processes hot metal from a blast furnace, cupola, arc furnace or other hot metal supply unit is refined to steel by reacting metalloids within the hot metal with oxygen. The chemical oxidation reactions which take place are exothermic and the resulting heat is utilised to elevate the temperature of the liquid metal to the desired casting temperature with any excess heat being used to melt additional quantities of iron-bearing coolant material. The total heat generated during refining is dependent on the total amount of oxidisable impurities in the hot metal and thus when operating such oxygen steelmaking processes it is possible only to incorporate a limited proportion of solid iron-bearing material in the charge to the converter.

In electric arc steelmaking processes and in particular in the electric arc practices which utilise approaching 100% solid iron-bearing material in the charge the energy for melting and super-heating to the desired casting temperature is mainly provided by electrical energy. Energy in this form is very costly and constitutes a very low efficiency in terms of fossil fuels utilization; the efficiency of conversion from fossil fuels to electrical energy at the generating station being on occasions as low as 30%. In addition the use of electrical energy imposes productivity constraints on the melting of solid iron-bearing material because of the need for very large transformers, large diameter electrodes and the associated refractory wear problems when operating at high power inputs.

In both oxygen steelmaking processes and in electric arc processes the waste offtake gas contains both sensible and chemical heat. Common practice on existing steelmaking plants is to fully combust cool and clean such offtake gases prior to their release to atmosphere. Thus considerable energy is wasted and in any event a severe constraint on the ability to use the energy in such offtake gases is imposed because the quantity, composition and temperature of the offtake gases varies throughout the steelmaking cycles.

Various attempts have been made to overcome the above limitations of steelmaking operations. For example, it has been attempted to increase scrap consumption in oxygen steelmaking processes and decrease electrical energy requirements in electrical arc processes by burning fuel with oxygen at the tip of a lance inserted into the charge within the steelmaking vessel. Heat transfer from an oxy-fuel flame to a charge occurs mainly by convection and radiation and is high whilst condtions of high interfacial contact area exist between the charge and the hot gases. However, once the charge becomes molten the charge/hot gas interfacial area is drastically reduced and the efficiency of heat transfer from the flame drops accordingly.

A further example of attempts to increase the scrap consumption in oxygen steelmaking processes and to decrease electrical energy requirements in electric arc processes involves the additions of a solid fuel such as silicon carbide or calcium carbide which is readily taken into solution by the bath. Injection of oxygen oxidizes the oxidizable constituents contained with the fuel thus liberating heat. This method can be disadvantageous when coal, coke or other solid carbonaceous fossil fuels in a treated or untreated form are used because such fuels tend to float on top of the molten metal or on top or within the slag and are not readily taken into solution by the bath.

Additionally when such carbonaceous materials are added in bulk form as part of the charge, such material may become incarcerated by partially melted iron leading to undesirably violent reactions upon subsequent release.

Proposals have also been made for the injection of hydrocarbons directly into the melt. Such injection, although liberating carbon which can subsequently enjoy an exothermic oxidation reaction, also liberates hydrogen only a portion of which is oxidised to advantage; thus hydrocarbon injection associated with oxygen injection is not considered to be an efficient means of liberating heat. An example of attempts to utilize the sensible and chemical heat in steelmaking offtake gases involves using such gases for preheating input charge materials. This has been demonstrated as feasible for batch and continuously fed material to certain known steelmaking operations. A major problem inherent in such attempts has been in accommodating the variable quantity, composition and temperature of the offtake gases and the timing of evolution of such gases in relation to the timing and heating of material inputs to the known batch steelmaking processes.

It is an object of the present invention to provide an improved method and apparatus for the manufacture of steel.

According to one aspect of the invention there is provided, in a method of manufacturing steel in a metallurgical vessel containing molten ferrous metal, a process for raising the energy level within the melt comprising injecting solid carbonaceous material below the surface of the melt and introducing oxygen or an oxygen-containing gas into the vessel to react with the carbonaceous material to liberate heat.

The solid carbonaceous material may be partially or wholly soluble in the unrefined or partially refined molten metal and may thus be taken into solution within the melt.

Also in accordance with the invention there is provided apparatus for manufacturing steel comprising a metallurgical vessel for containing a melt of unrefined or partially refined molten ferrous metal, means for injecting solid carbonaceous material below the surface of the melt and means for introducing oxygen or an oxygen containing gas into the vessel.

The oxygen or oxygen containing gases may be introduced into the vessel either through one or more submerged tuyeres in the base or side of the vessel or by jetting on to the surface of the molten metal.

The solid carbonaceous material may be injected into the melt either through one or more submerged tuyeres in the base or side of the vessel or by one or more submerged lances immersed below the level of the molten metal. The said material may comprise coal, coke, graphite or any other carbon-bearing material in particulate form and such carbonaceous material is preferably injected into the melt with a carrier gas which may be reducing, oxidizing or inert.

It will be appreciated that because heat is generated chemically within the molten charge itself the method in accordance with the invention is a highly efficient way of increasing the heat content of the charge. Thus the heat necessary to melt solid iron-bearing material can be generated at will by introducing the appropriate amount of carbonaceous material into the steelmaking vessel and simultaneously or subsequently partially or wholly removing the oxidizable material by introduction of oxygen.

The method in accordance with the invention for raising energy levels by heat generation may be utilized to increase the proportion of solid iron-bearing coolant used in the refining process. The method may thus include the further step of adding solid iron-bearing material to the melt during the refining process. The solid iron-bearing material is conveniently delivered to the upper surface of the melt and may comprise scrap, prereduced iron, granulated iron, iron ore, iron oxide scale, iron oxide fume or any other iron-containing material.

The method can be used to lower the electrical energy requirements in electric arc steelmaking. Thus the method in accordance with the invention may comprise manufacturing steel in an electric arc furnace wherein the furnace will include, in addition to the usual electrodes, means for injecting solid carbonaceous material below the surface of the molten metal and means for introducing oxygen or an oxygen containing gas into the furnace to react with the carbonaceous material to liberate heat. Conveniently in such a method and apparatus both the carbonaceous material and the oxygen or oxygen containing gas are introduced through submerged tuyeres in the base or sides of the furnace.

A further modification of the method described in either of the two preceding paragraphs comprises utilising the waste offtake gases to preheat the solid iron-bearing material before it is delivered to the melt. Thus there may be provided means above the upper level of the melt to contain the offtake gas and a rotary kiln to which the offtake gas is delivered and through which passes the solid iron-bearing material before it is delivered to the melt.

The said waste offtake gases may also be utilized to effect some degree of, or assist in, prereduction of the solid iron-bearing material within the rotary kiln when solid iron-bearing materials such as iron ore or iron oxide waste are utilized.

In the methods described in the preceding paragraphs the solid iron-bearing material may be delivered continuously during the refining process.

A further aspect of the method in accordance with the invention contemplates a continuous process for the manufacture of steel in a metallurgical vessel comprising injecting a solid carbonaceous material below the surface of the melt, introducing oxygen or an oxygen containing gas into the vessel to react with the carbonaceous material to liberate heat, delivering continuously to the melt a supply of iron-bearing material and continuously tapping refined molten steel from the vessel at a level below the slag. It will be appreciated that the constituent carbonaceous material and iron-bearing material and their means of delivery in this aspect of the invention may be as described in any of the preceding paragraphs relating to the present invention.

Also in accordance with the invention there is provided steel whenever produced by a method as described in any of the preceding paragraphs relating to the present invention.

Other features of the invention will become apparent from the following description given herein by way of example with reference to the accompanying drawings wherein like reference numerals refer to like parts throughout the several views and wherein:

FIG. 5 is a side cross-sectional view of a metallurgical vessel similar to FIGS. 1 and 4 but including a rotary kiln for receiving offtake gas from the vessel and through which passes solid iron-bearing material for delivery to the melt, and FIG. 6 is a side cross-sectional view of a metallurgical vessel similar to FIG. 5 but having additional means for the continuous tapping of molten steel.

Figure 1:
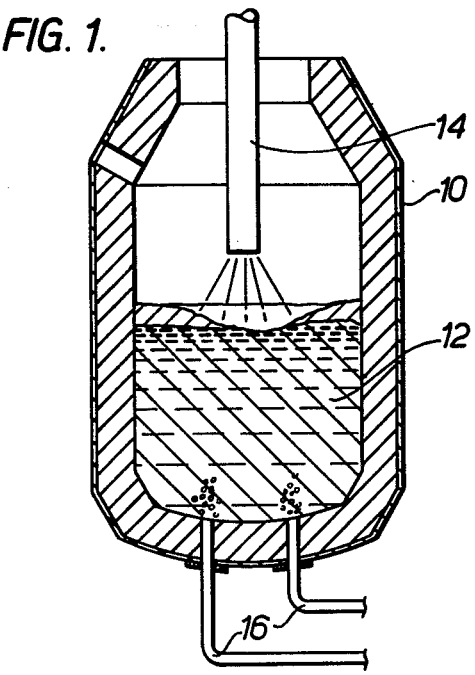
FIG. 1 is a side cross-sectional view of a metallurgical vessel in accordance with the invention having means for the top introduction of oxygen and the bottom injection of carbonaceous material.

Referring to FIG. 1 of the drawings there is shown a refractory lined metallurgical vessel 10 containing a metallic charge 12 which may be either completely liquid or partially liquid and partially solid. Lime and fluxes are added in accordance with conventional top blown oxygen steelmaking practice either with the initial charge or during the blowing period to help form a slag. In this example oxygen is jetted through a water cooled single or multi-port lance 14 on to the upper surface of the charge. Solid carbon-containing particulate material is introduced into the base of the charge through submerged tuyeres 16 in the base of the vessel 10. This apparatus thereby permits an advancement over conventional top blown oxygen steel-making practice by allowing a greater quantity of iron-bearing coolant material to be consumed in the charge due to the heat liberated upon the oxidation reaction between the oxygen and the solid carbon-containing material. Given a specific requirement for a desired increase in the weight or proportion of iron-bearing coolant in the charge prior calculations will determine the quantity of carbonaceous material to be injected.

Figure 2:
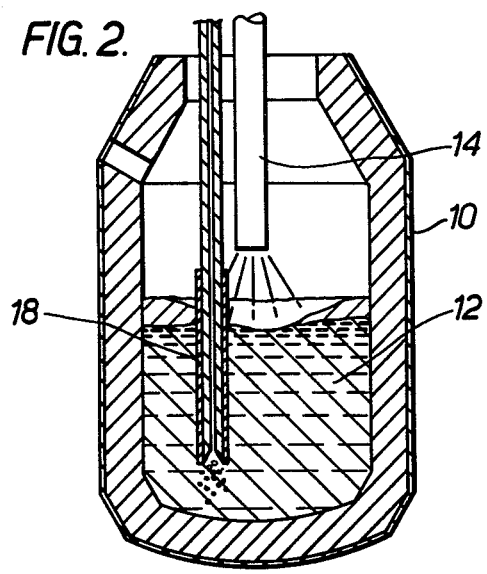
FIG. 2 is a side cross-sectional view of a metallurgical vessel having means for the top introduction of oxygen and a submerged lance for the injection of carbonaceous material.

A similar apparatus is shown in FIG. 2 of the drawings differing only from that shown in FIG. 1 in that the carbonaceous material is injected through a submerged lance 18 instead of through submerged tuyeres. It will be appreciated that the advantages of utilizing the method with the apparatus of FIG. 2 will be the same as those associated with the apparatus of FIG. 1.

Figure 3:
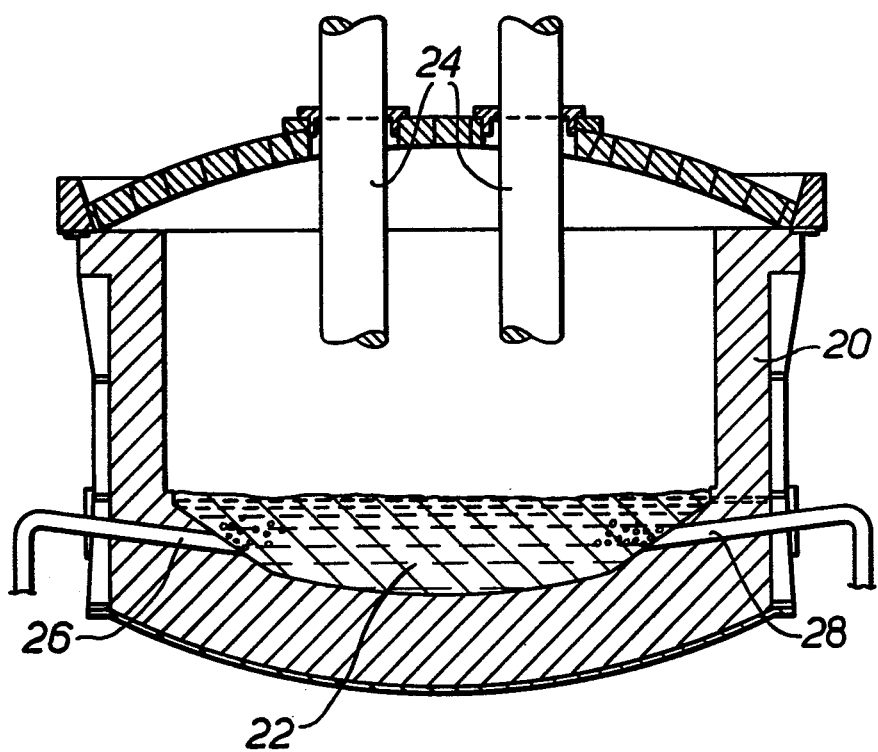
FIG. 3 is a side cross-sectional view of an electric arc furnace having submerged tuyeres for the introduction of oxygen and the injection of carbonaceous material.

FIG. 3 of the drawings illustrates an electric arc refractory lined vessel 20 containing a melt 22 being partially heated by electrodes 24. Solid carbonaceous material is injected through a submerged tuyere 26 in the base of the vessel whilst oxygen is introduced through another submerged tuyere 28. The quantity of electrical energy required to melt the solid iron-bearing material fed into the charge is reduced by an amount related to the quantity of carbonaceous material injected into and oxidized from the melt.

The electric arc furnace of FIG. 3 can be operated as a "hot heel" practice, i.e., a quantity of molten metal is retained in the vessel from a previous cast and solid iron-bearing material is added continuously or semi-continuously simultaneously with the introduction of solid carbonaceous material, oxygen and electrical energy until the desired steel weight is obtained at the desired composition and tapping temperature. Alternatively, the electric arc furnace of FIG. 3 can be operated with a batch charge of solid iron-bearing material without a hot heel with injection of solid carbonaceous material and oxygen being practised once a sufficient depth of molten metal has been established to take the carbon into solution.

Figure 4:
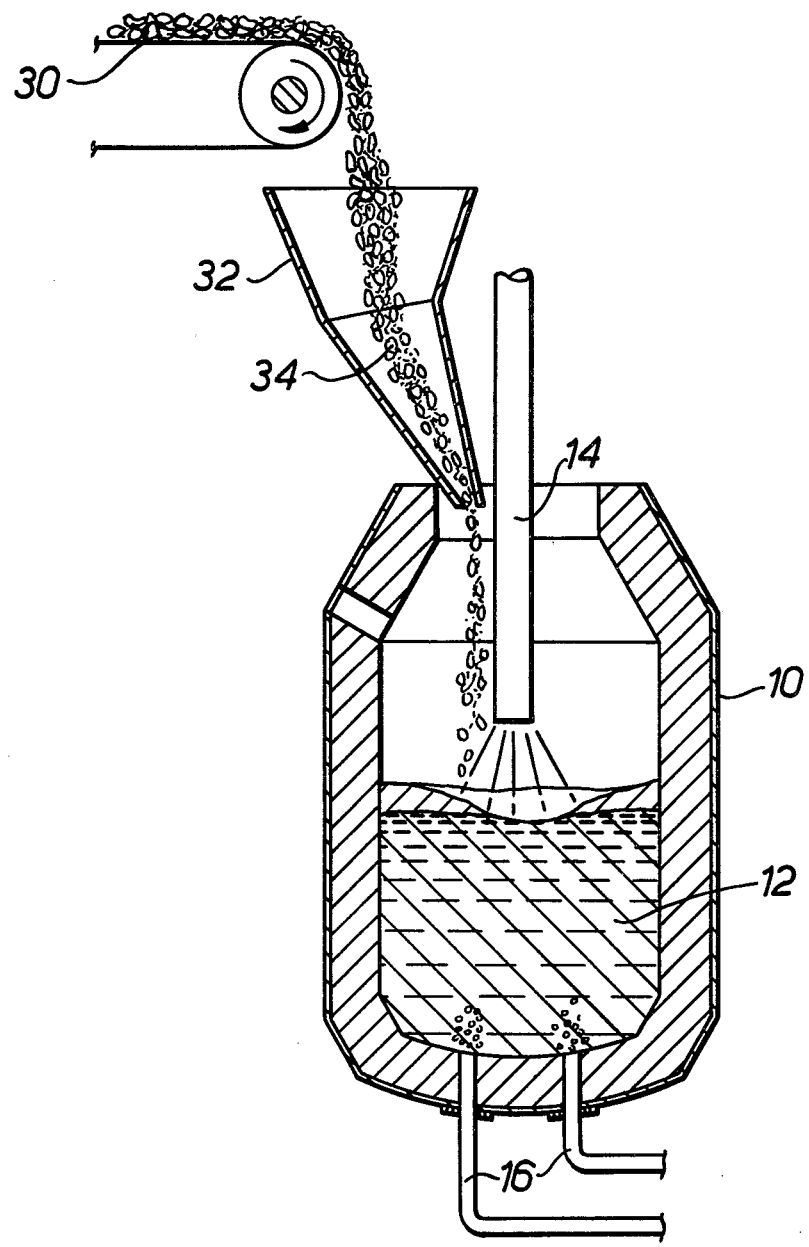
FIG. 4 is a side cross-sectional view of a similar vessel to that shown in FIG. 1 but having additional means for the delivery of solid iron-bearing material to the melt.

In FIG. 4 of the drawings there is illustrated a metallurgical vessel 10 similar to that shown in FIG. 1 having a lance 14 for the top introduction of oxygen on to the molten metal and slag and submerged tuyeres 16 in the base of the vessel for the injection of solid carbonaceous material. This apparatus additionally includes a feeding system comprising a conveyor 30 and hopper 32 for delivering solid iron-bearing material 34 to the upper surface of the melt. The hot heel may be retained from a previous steel-making charge which is built up to the desired casting weight, temperature and composition by the appropriate continuous introduction of solid carbonaceous material, oxygen and solid iron-bearing material. A method is then provided for the melting of solid iron-bearing material with the injected solid carbonaceous material being the only or prime energy source.

FIG. 5 of the drawings illustrates a metallurgical vessel similar to that shown in FIG. 4 with the addition that the steelmaking offtake gas is utilized as part or whole or an energy source to preheat the continuously fed solid iron-bearing material 34. As illustrated there is provided a hood 36 at the open upper mouth of the vessel 10 to contain the offtake gases and a rotary kiln 38 to which the offtake gas is delivered in countercurrent flow to the delivery of the solid iron-bearing material. This apparatus thus provides means for decreasing the required quantity of injected carbon and oxygen in order to achieve the desired cast weight and optimum preheat temperatures to the solid iron-bearing material can be determined for minimum consumption of injected solid carbonaceous material.

The said waste offtake gases may also be utilized to effect some degree of, or assist in, pre-reduction of the solid iron-bearing material within the rotary kiln when solid iron-bearing materials such as iron ore or iron oxide fume are utilized.

FIG. 6 of the drawings illustrates apparatus permitting the operation of a continuous steelmaking process which differs only from the method described with reference to FIG. 5 in that the molten steel at the desired composition and temperature is tapped continuously from the vessel 10 through a port 40 below the slag level. Control of throughput metal composition and metal temperature may be achieved by manipulation of the injection rate of the solid carbonaceous material, the oxygen injection rate, the feed rate of the solid iron-bearing material and the preheat temperature to the iron-bearing material.

In any of the various embodiments of the invention described herein with reference to FIGS. 1 to 6 it will be appreciated that the solid carbonaceous material may be coal, coke, graphite or any other carbon-containing material in particulate or slurry form and that a carrier gas is normally used to transport the carbonaceous material which gas may be reducing, oxidizing or inert. When the carbonaceous material is introduced into the metallurgical vessel through submerged tuyeres it will be appreciated that such tuyeres may be located in the base or side wall of the vessel and that any number of such tuyeres may be provided according to the specific requirements of the process. The solid iron-bearing material described with reference to FIGS. 3 to 6 may be scrap, pre-reduced iron, granulated iron, iron ore, iron oxide scale, iron oxide fume or any other iron containing substance. It will be appreciated that when iron in the oxide state is added in the various processes described herein the injected solid carbonaceous material will act as both a reductant for the iron oxide as well as a source of energy for melting.

In most of the processes described herein the oxygen or an oxygen containing gas is shown as being introduced to the metallurgical vessel through a water cooled lance situated above the melt, but other methods are possible for such oxygen introduction, such as tuyere injection or submerged lance injection. Where tuyeres are used for injection of oxygen and/or solid carbonaceous material the tuyeres may be of double or multiple concentric tube type having an annular shroud fluid surrounding the primary injectant tuyere. Such shroud fluid may be an inert gas or liquid, a hydrocarbon gas or liquid or an oxidizing gas or liquid, the fluid being chosen such as to minimize refractory and tuyere wear and to prevent tuyere blockage.

It is contemplated that tuyeres could be designed to permit injection of both oxidizing gas and solid carbonaceous material through the same tuyere or tuyeres. It is also contemplated that the solid iron-bearing material as described in the processes with reference to FIGS. 3 to 6 could also be injected in powder or granular form into the melt through submerged tuyeres. Such solid iron-bearing material may contain carbon in a chemically or physically combined form and in such cases it will be appreciated that the quantity of separately injected solid carbonaceous material could be reduced.

Two specific Examples of the use of the basic principles underlying the present invention will now be described with reference respectively to the processes related to FIGS. 1 and 4 of the drawings.

EXAMPLE I 940 kgs of hot metal of composition 4.16%C, 0.026%S, 0.047%P, 0.8%Si, 0.82%Mn at a temperature of 1330° C were charged into a converter shaped vessel containing 33 kgs of scrap. 48 kgs of lime were added and the vessel contents top blown with oxygen at a rate of 230 m$^3$/hr for 13 mins. At this stage blowing was interrupted and sensors showed the bath temperature to be 1625° C with the bath carbon content being 0.68%. Oxygen blowing was recommenced at the same rate of 230m$^3$/hr with the bath at a temperature of 1550° C and simultaneously solid particulate graphite was introduced through a basal tuyere at a rate of 3.5 kg/min. Simultaneously oxygen lancing and carbon injection were continued for a period of 17 minutes, during which time 60 kgs. of graphite had been added together with 69 kgs of scrap. After termination of graphite injection and oxygen blowing, the bath contained 0.06% carbon and was at a temperature of 1670° C. The tuyere used for carbon injection was of annular design and was operated as follows:

Shroud gas — air at 7m$^3$/hr
Carrier gas — argon at 30m$^3$/hr
The tuyere core diameter was 7 mm with an annular gap of 1 mm.

EXAMPLE II 1220 kgs. of hot metal of composition 4.2%C, 0.025%S, 0.038%P, 0.9%Si, 0.65%Mn at a temperature of 1285° C were charged into a converter shaped vessel containing 80 kgs. of scrap. 50 kgs. of lime were added and the vessel contents top blown with oxygen at a rate of 230m³/hr for 18 mins. At this stage the blow was interrupted with the metal at 1710° C at a carbon content of 0.42%.

Oxygen blowing was then recommenced at the rate of 230m³/hr simultaneously with the introduction of graphite powder through a basal tuyere at a rate of 4.1 kgs/min. This stage started with the bath at a temperature of 1640° C and continued for 18.5 mins., a total of 76 kgs of graphite being injected during this period. 90 kg of SL/RN prereduced iron pellets were added continuously during the 18.5 min blowing period. The bath temperature at the end of the graphite injection period was 1585° C and the bath carbon content 1.08%.

These two Examples of results from a pilot plant illustrate that tuyere injection of a solid carbonaceous material simultaneously with oxygen lancing allows iron-bearing materials to be melted and that this has occurred in spite of the very high heat losses (up to 18° C/min) from metal contained within a pilot plant converter operating at the scale of operation described in the Examples.

We claim:

1. A method of raising the energy level of molten metal in a metallurgical vessel in the course of manufacturing steel which comprises injecting solid carbonaceous material into said molten metal below the surface thereof and introducing an oxidizing gas into the vessel to react with the carbonaceous material to liberate heat.

2. A method of raising the energy level of a molten metal in a metallurgical vessel in a steel manufacturing process which comprises the steps of: injecting solid carbonaceous material selected from the group consisting of particulate coal, coke, graphite or mixtures thereof into said molten metal below the surface thereof; and introducing an oxidizing gas into said vessel through the base or side of said vessel.

3. A method according to claim 1 wherein the oxidizing gas is blown on to the surface of the melt.

4. A method according to claim 1 wherein the oxidizing gas is introduced into the melt through one or more tuyeres in the base or side of the vessel.

5. A method according to claim 4 wherein the vessel is an electric arc furnace.

6. A method according to claim 1 wherein the carbonaceous material comprises a material selected from the group consisting of particulate coal, coke, graphite or mixtures thereof.

7. A method according to claim 6 wherein the carbonaceous material is injected into the melt through one or more tuyeres by means of a carrier gas.

8. A method according to claim 7 wherein the carrier gas is a reducing oxidizing or inert gas.

9. A method according to claim 1 including the additional step of introducing solid iron-bearing material to the melt during the refining process.

10. A method according to claim 9 wherein the solid iron-bearing material comprises scrap, pre-reduced iron, granulated iron, iron ore, iron oxide scale or iron oxide fume.

11. A method according to claim 9 wherein the solid iron-bearing material is delivered to the upper surface of the melt during the refining process.

12. A method according to claim 9 wherein the solid iron-bearing material is preheated by the waste offtake gases from the metallurgical vessel before the material is delivered to the melt.

13. A method according to claim 12 wherein the solid iron-bearing material is preheated in a rotary kiln.

14. A method according to claim 12 wherein the solid iron-bearing material, when having a reducable element therein, is at least partially pre-reduced by the waste offtake gases before the material is delivered to the melt.

15. A method according to claim 9 wherein the solid iron-bearing material is in particulate form and is injected into the melt through one or more tuyeres by means of a carrier gas.

16. A method as claimed in claim 9 wherein the solid iron-bearing material is delivered continuously to the melt during the refining process.

17. A method according to claim 16 wherein the steel manufactured in the metallurgical vessel is tapped continuously from the vessel.

* * * * *